US008773411B2

(12) United States Patent
van Lieshout et al.

(10) Patent No.: US 8,773,411 B2
(45) Date of Patent: Jul. 8, 2014

(54) ELECTRONIC APPARATUS COMPRISING COLLAPSIBLE DISPLAY WITH NON-DEFORMABLE ACTIVE AREAS

(75) Inventors: Petrus Johannes Gerardus van Lieshout, Beek en Donk (NL); Johannes Cornelis Adriaan Hamers, Breugel (NL); Hjalmar Edzer Ayco Huiteman, Veldhoven (NL)

(73) Assignee: Creator Technology B.V., Breda (NL)

( * ) Notice: Subject to any disclaimer, the term of this patent is extended or adjusted under 35 U.S.C. 154(b) by 803 days.

(21) Appl. No.: 12/745,386

(22) PCT Filed: Nov. 28, 2008

(86) PCT No.: PCT/NL2008/050760
§ 371 (c)(1),
(2), (4) Date: May 28, 2010

(87) PCT Pub. No.: WO2009/070025
PCT Pub. Date: Jun. 4, 2009

(65) Prior Publication Data
US 2010/0295761 A1    Nov. 25, 2010

Related U.S. Application Data

(60) Provisional application No. 60/991,174, filed on Nov. 29, 2007.

(51) Int. Cl.
*G09G 5/00*    (2006.01)

(52) U.S. Cl.
USPC ............ 345/204; 345/3.1; 345/905; 361/681; 361/679.04; 361/679.26

(58) Field of Classification Search
USPC ................. 345/1.1, 3.1, 5, 87–100, 204, 905; 361/681–683, 679.04, 679.26, 679.32, 361/679.4, 679.5
See application file for complete search history.

(56) References Cited

U.S. PATENT DOCUMENTS

| 6,016,176 A * | 1/2000 | Kim et al. ................... 349/84 |
| 7,593,086 B2 | 9/2009 | Jeong et al. |
| 2001/0018225 A1 | 8/2001 | Tanaka |
| 2003/0132443 A1 | 7/2003 | Kim |
| 2004/0119071 A1 | 6/2004 | Takahara |

(Continued)

FOREIGN PATENT DOCUMENTS

| CN | 1949309 A | 4/2007 |
| EP | 0424074 A2 | 4/1991 |

(Continued)

OTHER PUBLICATIONS

International Search Report for PCT/NL2008/050760 dated Aug. 18, 2009.

(Continued)

*Primary Examiner* — Jennifer Nguyen

(57) ABSTRACT

The invention relates to an electronic apparatus comprising a collapsible electronic display (20) having an active region (21) conceived to be extendable and comprising a substantially deformable area (24a, 24b) and a substantially non-deformable area in use; and electronic components for enabling electrical connectivity for the electronic display, wherein the electronic components are arranged on the substantially non-deformable area (23a, 23b, 23c) outside the active region (21).

15 Claims, 9 Drawing Sheets

(56) References Cited

U.S. PATENT DOCUMENTS

| | | | | |
|---|---|---|---|---|
| 2008/0116579 A1* | 5/2008 | Araumi | ............... | 257/759 |
| 2008/0169464 A1* | 7/2008 | Gong et al. | ............... | 257/40 |
| 2008/0204367 A1* | 8/2008 | Lafarre et al. | ............... | 345/55 |
| 2008/0220626 A1* | 9/2008 | Yeh | ............... | 439/67 |
| 2010/0164973 A1* | 7/2010 | Huitema et al. | ............... | 345/581 |

FOREIGN PATENT DOCUMENTS

| | | |
|---|---|---|
| EP | 1785805 A2 | 5/2007 |
| GB | 2 332 294 A9 | 6/1999 |
| JP | 11-272205 | 10/1999 |
| JP | 11 272205 A | 10/1999 |
| WO | WO 89/05034 A | 6/1989 |
| WO | WO 03/067564 A | 8/2003 |
| WO | WO 2004/047059 A | 6/2004 |
| WO | WO 2004/088490 A | 10/2004 |

OTHER PUBLICATIONS

Japan Patent Office, Office Action, Patent Application No. 200880123190.9, Jun. 5, 2012, Japan.

European Patent Office, Search Report, Patent Application Serial No. 13184877.2, May 9, 2014, Germany.

* cited by examiner

ELECTRONIC APPARATUS COMPRISING COLLAPSIBLE DISPLAY WITH NON-DEFORMABLE ACTIVE AREAS

FIELD OF THE INVENTION

The invention relates to an electronic apparatus. More particularly, the invention relates to an electronic apparatus comprising a collapsible display conceived to be alternated between a collapsed state upon storage and an extended state during use.

BACKGROUND OF THE INVENTION

An electronic apparatus as is set forth in the opening paragraph is known in the art. For instance, such apparatus may relate to a mobile phone or an organizer, wherein the display is arranged as a flexible and collapsible body providing a compact structure in a stand-by state and a device with an increased display area during use. The collapsible display may be stored in a housing of the electronic apparatus, for example it may be rolled about a suitable roller. Alternatively, the collapsible display may be wrapped about a housing of the electronic apparatus.

In order to control an operation of the electronic collapsible display, it is provided with suitable electronic components, like display drivers. It is a disadvantage of the electronic apparatus known in the art that mounting of display drivers to flexible display modules has practical limitations due to the fact that the non-rigid display substrate constitutes a relatively poor carrier for rigid electronic components. Usually, a non-deformable tail edge of the flexible electronic display is used as a contact ledge for providing electrical connectivity to the electronic display. The tail edge is usually kept flat, as it is located proximal to a substantially non-extendable portion of the collapsible display. Extendable portions are generally not suitable for receiving drivers as flexible and deformable areas of the display provide poor contact to substantially rigid driver components.

SUMMARY OF THE INVENTION

These limitations to position the contact ledge increase interconnect density, which makes creating a robust interconnect structure difficult. In addition, it increases a length of interconnecting tracks running from the drivers to a destination in the display area, increasing electrical resistance of these tracks, on one hand and increasing their vulnerability to mechanical damage, on the other hand.

It is desired to provide an electronic apparatus comprising a collapsible display wherein mounting of electronic components is simplified resulting in improved performance and robustness of said apparatus as a whole.

To this end the electronic apparatus according to the invention comprises:
  a collapsible, flexible electronic display conceived to be extendable, wherein said flexible display comprising a substantially deformable area and a substantially non-deformable area in use; and
  electronic components for enabling electrical connectivity for the electronic display, wherein the electronic components are arranged on the substantially non-deformable area.

The technical measure of the invention is based on the insight that in use some areas of the flexible display undergo deformation during extending and collapsing, whereas other areas do not undergo substantially any deformation. Because in the extended state the flexible, the collapsible display constitutes a substantially flat structure, the non-deformable area is kept substantially flat not only during use, but also during a transition between an extended state and a collapsed state. In addition, such non-deformable area is kept substantially flat in the collapsed state during storage.

An example of an electronic apparatus comprising a collapsible display is shown herein (see, e.g., FIG. 1). It is noted that the non-deformable area may, by way of example, comprise a plurality of non-deformable sub-areas, which may be interconnected with each other, or may be isolated from each other. It will be appreciated that the collapsible electronic display comprises an active area whereon a suitable image or a suitable alpha-numerical information may be provided, and a non-active area, used, for example, for providing electrical connectivity to the electronic elements forming the active area of the display, or used as an edge area surrounding the active area of the display. It will be further appreciated that such non-deformable area or areas may be arranged within the active region of the flexible display, or within the non-active region of the flexible display. It is found to be advantageous to provide such non-deformable areas outside the active region of the flexible display, because in this case relatively voluminous integrated circuits may be carried by such area or areas without interfering with a normal operation of the flexible display. Such integrated circuits may be, for example, used to provide electronic connectivity to the bounding area of the flexible display.

Therefore, by providing such non-deformable, substantially flat area or areas on the collapsible display and by arranging these areas as ledges for housing electronic components of the flexible display, spatial constraints for the placement of such electronic components are relieved. More details on the non-deformable areas are provided with reference to FIG. 3.

It is found that a plurality of non-deformable areas of the collapsible display can be identified. Therefore, when the electronic components, for example, the display drivers are positioned on one or more of these areas, optionally next to the tail edge of the collapsible display, an interconnect density and an overall interconnect may be reduced. This will be discussed in more detail with reference to FIG. 2.

In an embodiment of the electronic apparatus according to the invention, the electronic apparatus comprises an interconnecting element for providing an electrical interconnection for the electronic components, whereby the interconnecting element may be arranged underneath the display. The interconnecting element comprises, for example, a harness structure arranged on the backplane of the collapsible display. The harness structure, shown schematically in FIG. 4 may be implemented from a suitable thin flex-foil and may be mounted underneath the display. This embodiment has an advantage in that a relatively simple manufacturing of a flexible display can be enabled by using a known interconnecting harness, as is currently used in, for example notebook technology. Preferably, such interconnecting layer is detachably arranged on the flexible display, so that it may be separated from the flexible display and replaced by another interconnected layer, if required. Also, detachable arrangement of the interconnecting layer enables manufacturing separate from the display.

Alternatively, the interconnecting element comprises an interconnecting layer patterned on a substrate of the collapsible display. This embodiment is discussed in further details with reference to FIG. 5. This embodiment has an advantage in that the interconnection functionality is integrated into a pattern of the substrate layer of the collapsible display. In order to implement this embodiment, the display substrate potentially undergoes extra processing steps such as, for example, a step of depositing and patterning of the one or more backside interconnect layers.

Preferably, these processing steps are carried out before processing of the usually much more vulnerable display layers. In an exemplary embodiment, the following substrate processing steps may be carried out (see FIG. 5):

1. coating a back side of the substrate foil with a layer of conducting material, such as copper. The coating may be carried out using suitable chemical or galvanic methods;
2. patterning the layer of conducting material, for example, using lithography or galvanic growing;
3. coating the layer of conducting material with a filling layer, for example a glue layer; and
4. arranging, for example, using lamination, the resulting structure onto a carrier wafer for further processing.

In the above-summarized embodiment of the electronic apparatus according to the invention it is required to provide vias (contacts between front side and back side conductors). The vias may be implemented in the following alternative ways:

making holes (drill, etch, laser cut) through the resulting structure to expose the layer of the conducting material to a further (front side) layer of the conducting material (see FIG. 6a);

folding the edge of the resulting structure, preferably around a suitable spacer and subsequently bonding it using, for example, a conductive glue, for enabling an electrical contact between a first layer of the conducting material and a second layer of the conducting material (see FIG. 6b);

bonding an anisotropically conducting foil around the edge of the substrate for providing electrically conductive tracks connecting the first and the second electrically conducting layer (see FIG. 6c).

In a further embodiment of the electronic device according to the invention the collapsible display is arranged on a member having substantially flat surfaces for supporting the substantially non-deformable area of the electronic display.

It is found to be advantageous to provide a device, for example an electronic device comprising a wrappable display having several non-deformable areas that can be used to place driver integrated circuits (IC's). Alternatively, an electronic device comprising a rollable display may be used. For this purpose a conventional cylindrical roller with a round cross-section may be substituted by a member having substantially flat surfaces for supporting the substantially flat, non-deformable areas of the collapsible display. For example the member may comprise a body, like a cylinder with an oval cross-section or a substantially rectangular or a square cross-section. It will be understood that a great plurality of suitable cross-sections is possible. Exemplary embodiments of the member are shown in FIG. 7. The member may have cavities to accept drivers in collapsed situation, which is advantageous as it provides supplementary means for protection of a surface of the flexible display during collapsing.

In a further embodiment of the electronic apparatus according to the invention, instead of using rigid electronic components, flexible electronic components may be applied. Such flexible electronic components further improve durability of the electronic collapsible display. It is noted, that such flexible electronic components may be used in addition to the rigid electronic components arranged on the non-deformable area of the active region of the display, as they may operate on the deformable areas.

These and other aspects of the invention will be described with reference to Figures.

DETAILED DESCRIPTION OF THE DRAWINGS

Figure 1:
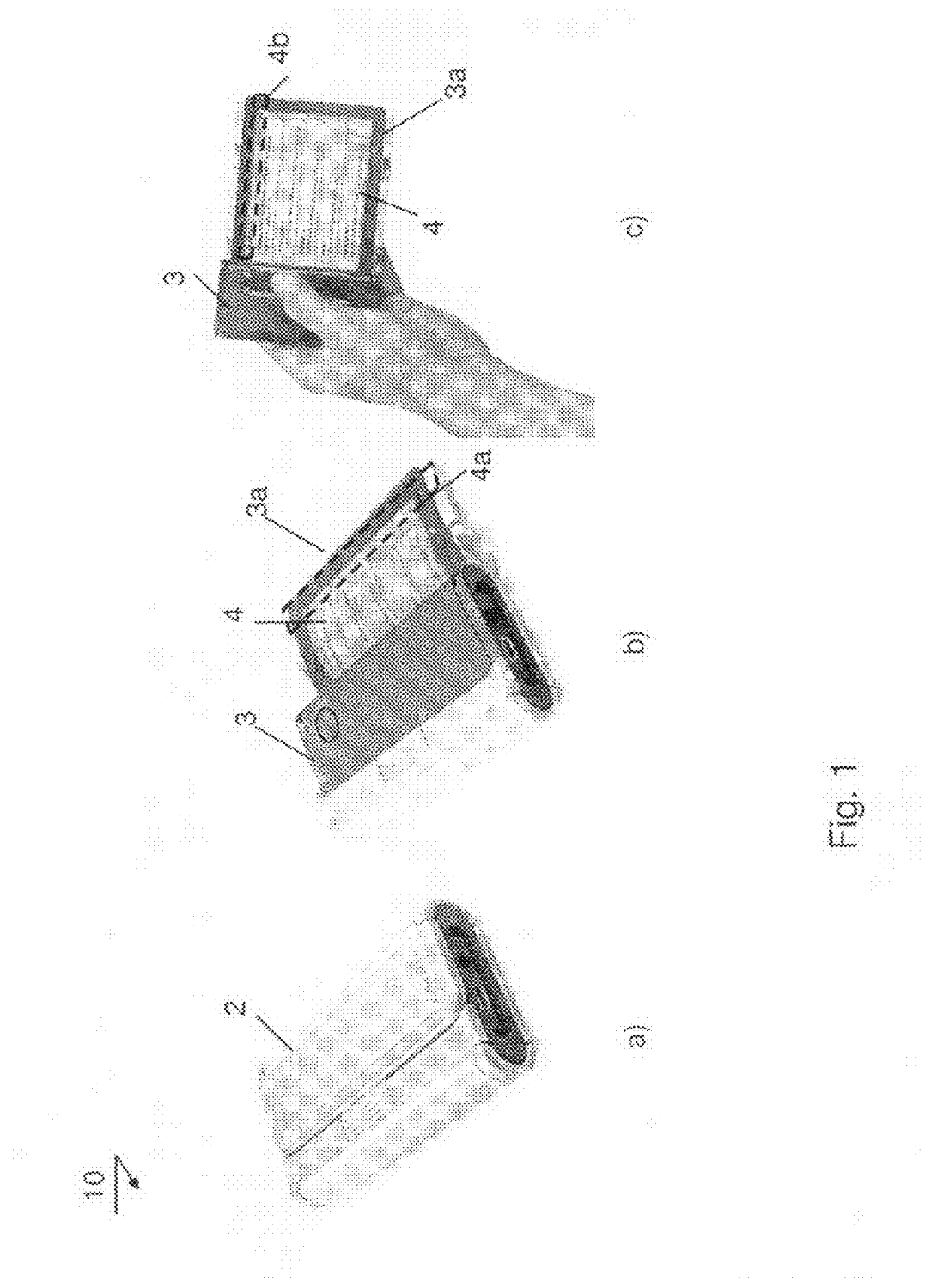
FIG. 1 presents a schematic view of an electronic apparatus comprising a collapsible display according to the invention.

FIG. 1 presents a schematic view of an electronic apparatus comprising a collapsible display according to the invention. The electronic apparatus 10 may relate to a mobile phone, a palmtop computer, an electronic organizer, or any other portable electronic device comprises a flexible display cooperating with a housing 2. In this particular embodiment the housing 2 is arranged to be unfoldable and wrappable about a core 3, whereby the flexible display 4 is conceived to be extended from its collapsed state into an extended state upon use. In order to support the flexible display during use and to protect it from mechanical damage, the housing 2 comprises rigid portions 3a conceived to at least partially receive edge portions of the flexible display 4a, 4b. It will be appreciated that during folding and unfolding of the housing 2 some parts of the flexible display 4 undergo deformation, whereas other parts of the flexible display undergo substantial no deformation. This will be discussed in further detail with reference to FIG. 2.

Figure 2:
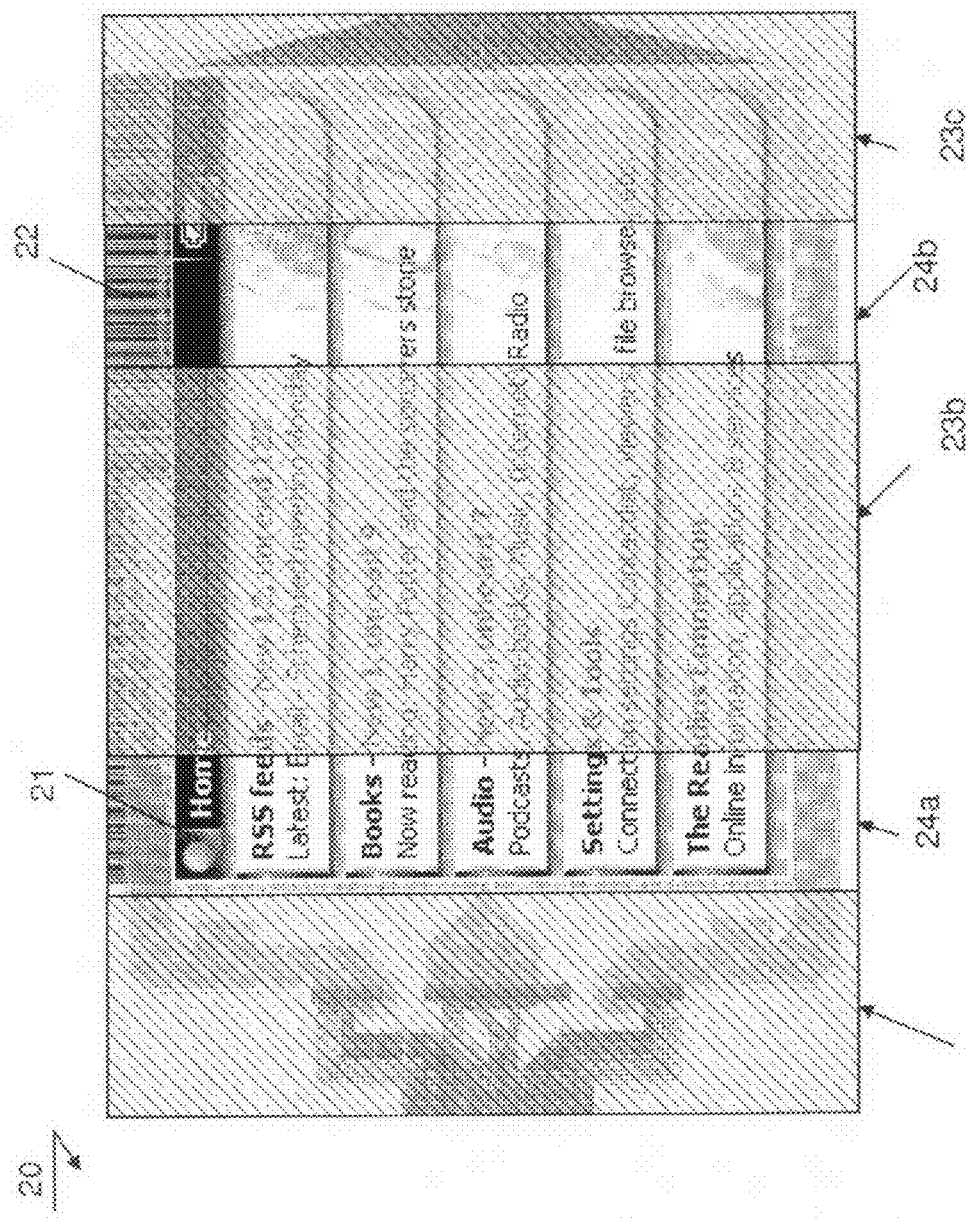
FIG. 2 presents a schematic view of a collapsible display having non-deformable areas and deformable areas for a wrappable display.

FIG. 2 presents a schematic view of a collapsible electronic display having non-deformable areas and deformable areas for a wrappable display. The display 20 may comprise a suitable plurality of deformable regions, like regions 24a, 24b and a suitable plurality of substantially non-deformable regions, like regions 23a, 23b, 23c. This is explained by the fact that the regions 24a, 24b correspond to respective hinged areas of the housing 2 of FIG. 1 which define flexing regions for folding and unfolding of the housing 2 and the flexible display 4 cooperating with the housing 2. The display 20 comprises an active area 21 whereon suitable information may be provided and a plurality of edge portions 22. These substantially non-deformable regions 23a, 23b, 23c are used for arranging suitable electronic components of the flexible display. It will be appreciated that although it may suffice to use one such non-deformable area, it is advantageous to use a plurality of such areas, preferably all such areas thereby reducing a density of electronic components per unit area of the flexible display as well as track length. This may substantially increase robustness of the flexible display in use.

Figure 3:
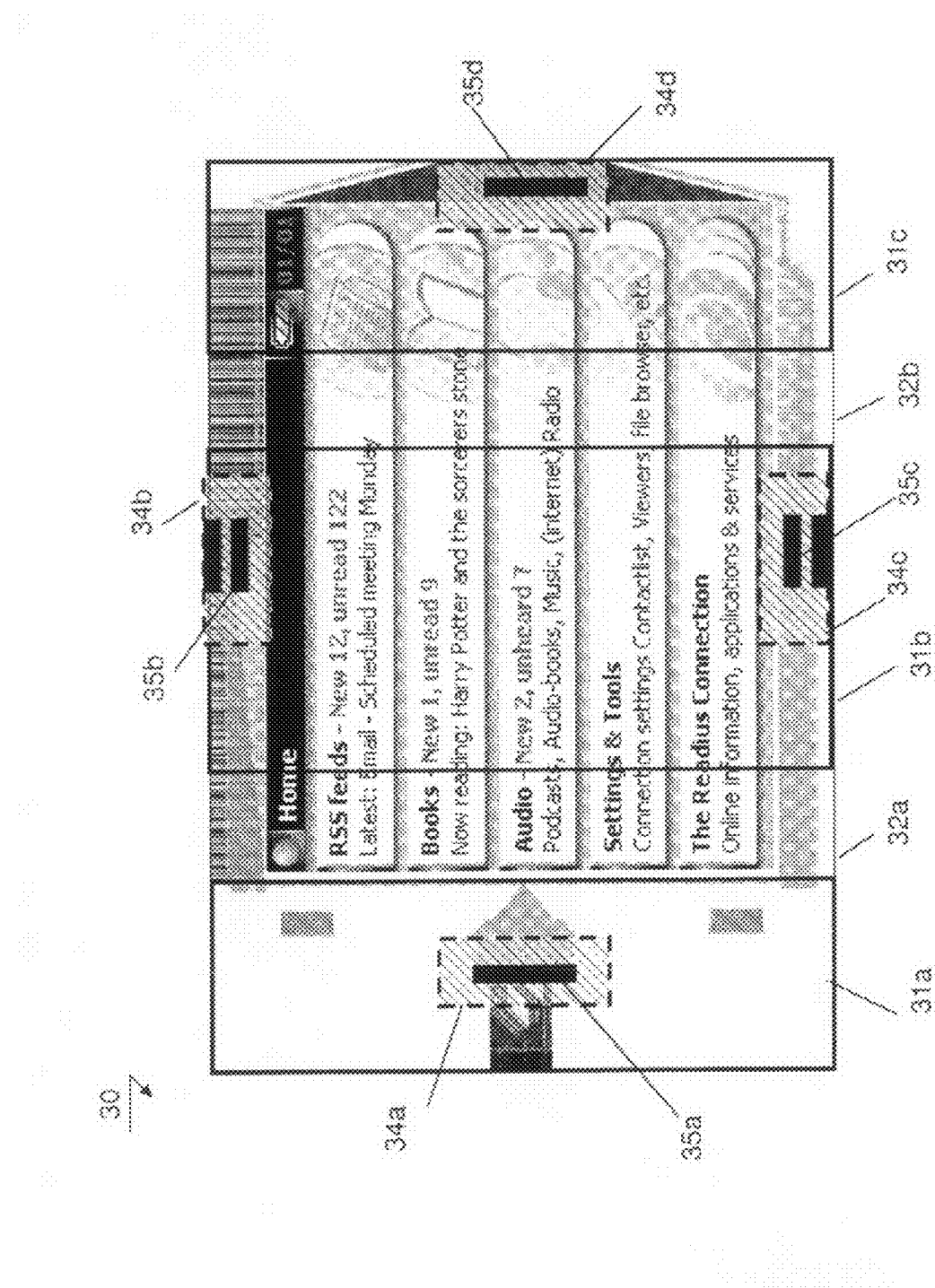
FIG. 3 presents a schematic view of an embodiment of the interconnecting element of the collapsible display.

FIG. 3 presents a schematic view of an embodiment of the interconnecting element of the collapsible electronic display. The display 30 according to the present embodiment comprises electronic components, like integrated circuits (IC) 35a, 35b, 35c, 35d, which are arranged on the non-deformable areas of the flexible display. It will be appreciated that areas 34a, 34b, 34c, 34d, corresponding to respective IC's mounting positions, may be located anywhere within the non-deformable regions 31a, 31b, 31c, preferably at places not interfering with an active area of the flexible display. The active area of the display usually corresponds to an area whereon an image may be generated. Also in this embodiment the substantially non-deformable regions 31a, 31b, 31c are alternated with deformable regions 32a, 32b. It is also possible to place the drivers on a rear side of the display, either on the harness as described in FIG. 4, or on the interconnect layers as described in FIG. 5.

Figure 4:
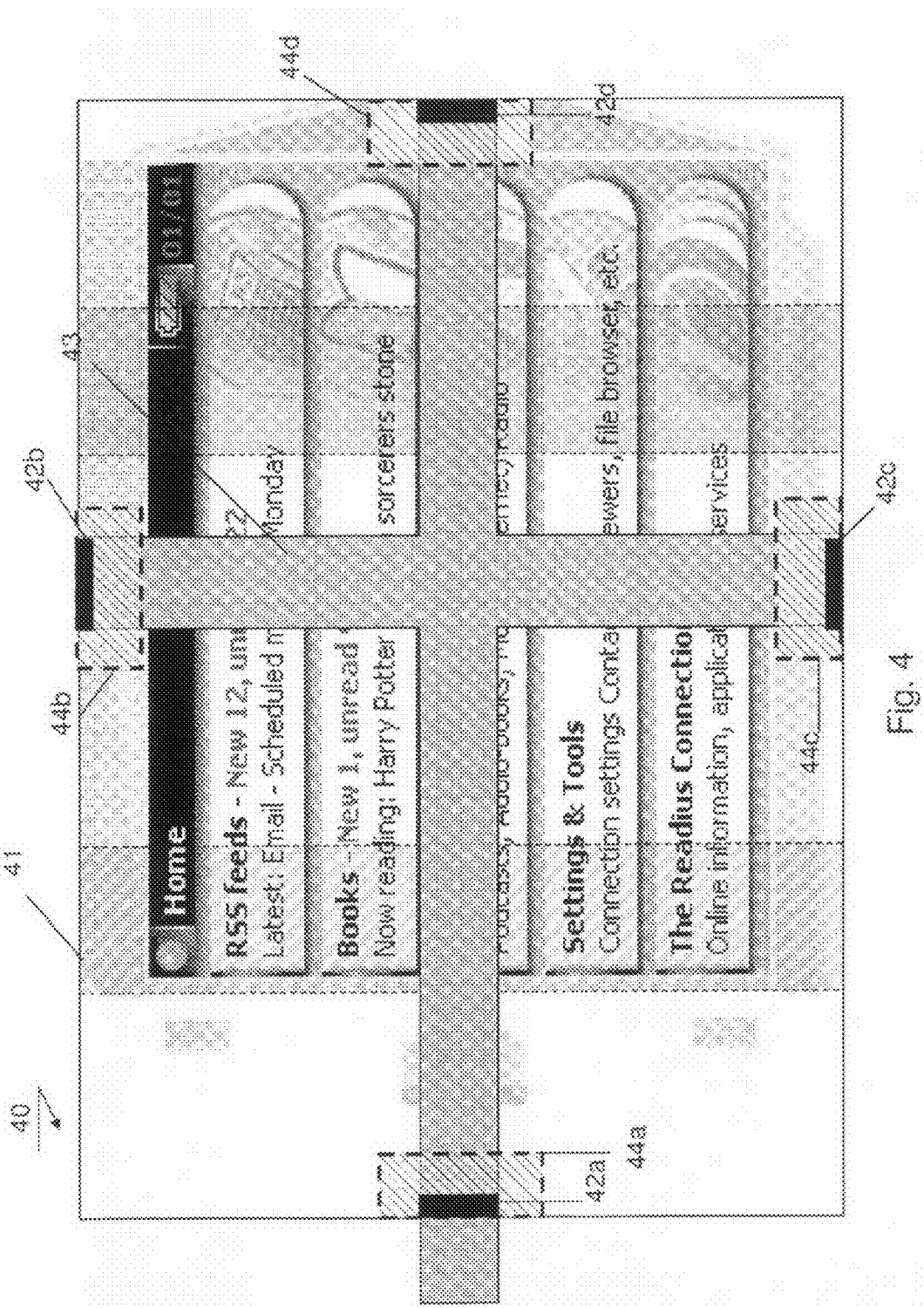
FIG. 4 presents a schematic view of a further embodiment of the interconnecting element of the collapsible display.

FIG. 4 presents a schematic view of a further embodiment of the interconnecting element of the collapsible electronic display. In this embodiment of the flexible display 40, a suitable interconnection of the electronic components 42a, 42b, 42c, 42d arranged on the respective non-deformable regions 44a, 44b, 44c, 44d of the display's area 41 is enabled by means of an interconnecting means such as, for example, a harness-like structure 43. The harness-like structure 43 is preferably manufactured from a thin flexible foil and is preferably mounted underneath the display's area 41. It is noted that the harness-like structure 43 may be integrated in the display, or it may be fixedly attached to the display, or even be made attachable to the display during extension of the display from its storage position.

Figure 5:
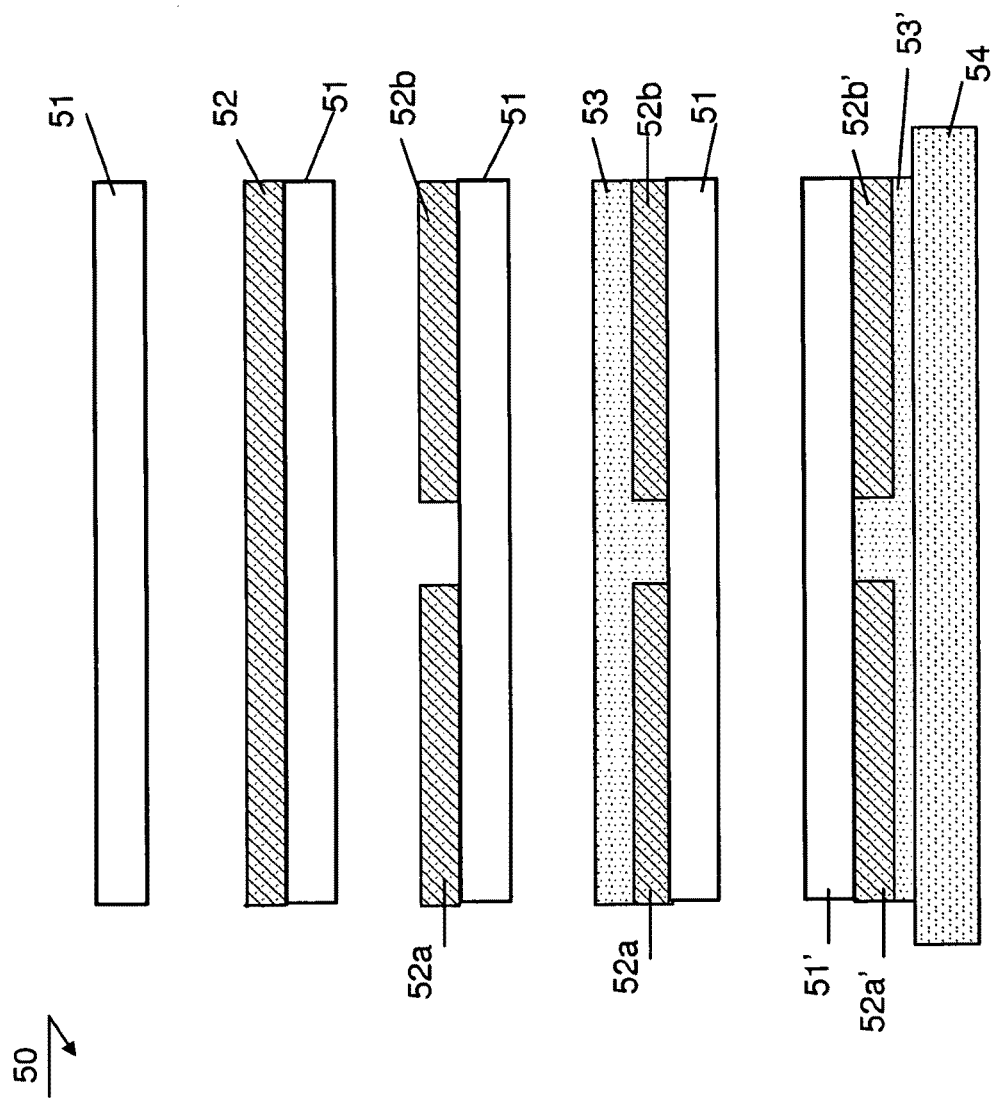
FIG. 5 presents a schematic view of an embodiment of a method of substrate processing for enabling an interconnecting element comprising an interconnect layer patterned on a substrate of the collapsible display.

FIG. 5 presents a schematic view of an embodiment of a method of substrate processing for enabling provision of an interconnecting element comprising an interconnecting layer patterned on a substrate of the collapsible electronic display. This embodiment provides an alternative solution for interconnecting the electronic components positioned on the non-deformable regions of the flexible display as is explained with reference to the foregoing. Instead of using a harness, or other means, a back side of the flexible display may be used for providing electrical connection between the electronic components. To this end, a display substrate may be processed with extra processing steps such as, for example, by performing the steps of deposition and patterning of the backside interconnecting layer or layers. Preferably, this may be done before processing vulnerable display layers. For example, a following processing method, described herein below, may be used.

First, a substrate 51 may be selected and subsequently coated with a suitable electrically connecting layer 52 comprising a suitable conductive material such as, for example, copper. The coating process may comprise a chemical or a galvanic method. Next, the electrically conducting layer 52 may be patterned to yield suitable portions 52a, 52b of the electrically conducting layer. For the patterning step of the method, either lithographic patterning or galvanic patterning may be used. It is noted that in an alternative embodiment, the steps of deposition and patterning may be implemented as a joint processing step, e.g. by using screen-printing. After the electrically conducting layer is patterned, it is covered by a filling layer, for example a filling glue layer 53, after which the resulting structure may be inverted so that the substrate 51 is positioned on the top. Finally, the resulting inverted structure may be arranged on a carrier wafer 54 for further processing on top of substrate 51'. For this purpose the resulting structure may be laminated on the carrier wafer 54.

Figure 6A:
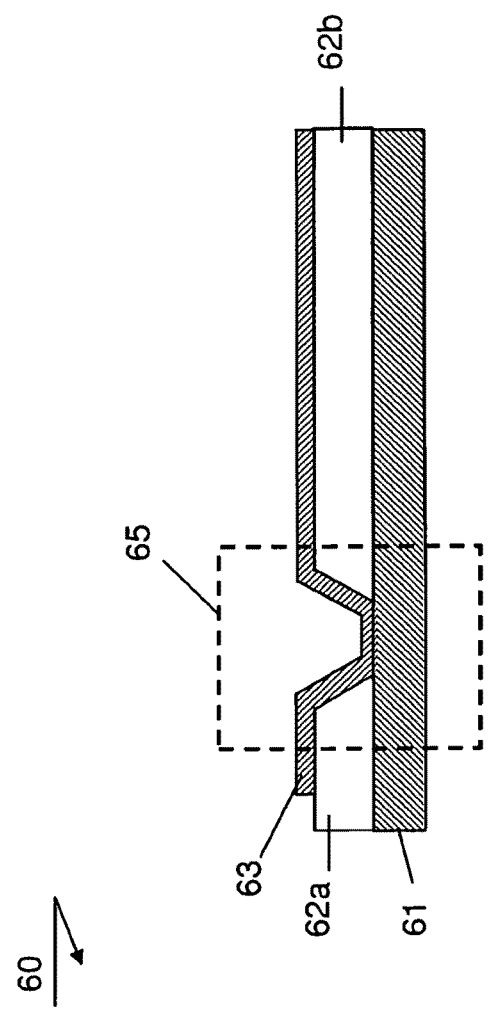
FIG. 6a presents a schematic view of an embodiment of a method for providing a top-bottom contact in the structure of FIG. 5.
Figure 6B:
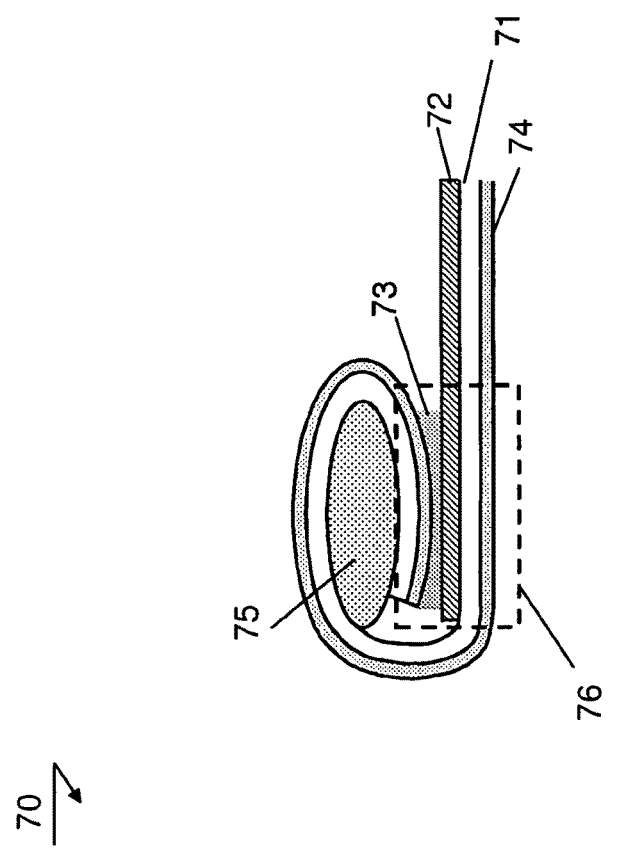
FIG. 6b presents a schematic view of a further embodiment of a method for providing a top-bottom contact in the structure of FIG. 5.
Figure 6C:
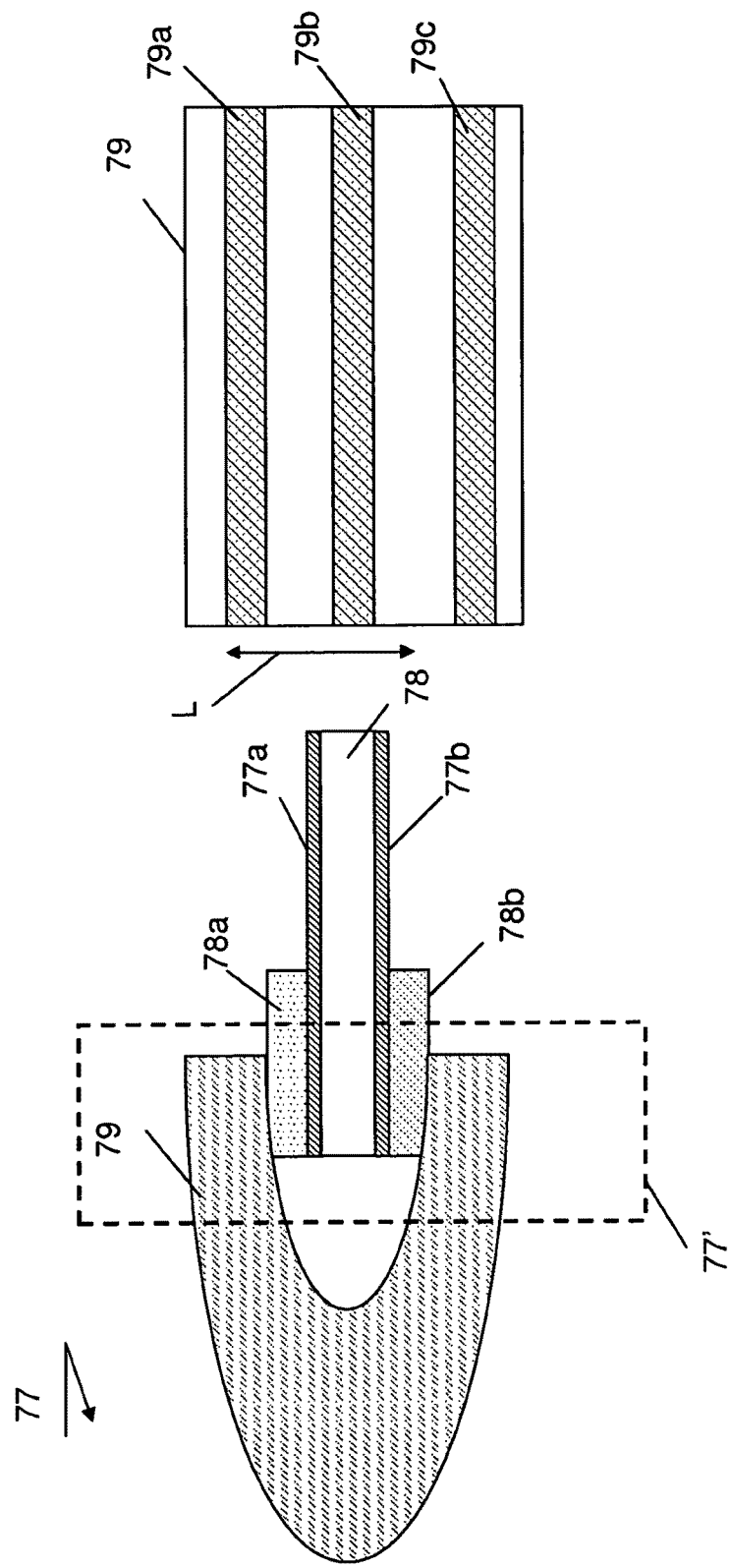
FIG. 6c presents a schematic view of a still further embodiment of a method for providing a top-bottom contact in the structure of FIG. 5.

In order to bring the electrically conducting layer 52 into electrical contact with a further electrically conducting layer (not shown) of the flexible display a provision of top-bottom interconnections may be required. FIGS. 6a, 6b, 6c schematically depict examples of various suitable techniques/arrangements/structures for providing an electrical contact between the electrically conducting layers of the flexible display.

FIG. 6a presents a schematic view of an embodiment of a method for providing the top-bottom interconnection, such as a via, in the structure of FIG. 5. In an illustrative embodiment, a substantially transverse cross-section 60 with respect to a plane of the flexible display is shown. The flexible display comprises a first layer of electrically conducting material 61, a second layer of electrically conducting material 63 and an electrically insulating material 62a. In a region 65 a via is provided prior to depositing the second layer of the conducting material 63 thereby enabling an electrical contact between the first layer of electrically conducting material 61 and the second layer of electrically conducting material 63. Via or vias of the kind shown in FIG. 6a may be manufactured, for example by drilling, etching, laser cutting or by any other suitable way. Another way to make vias is by piercing through a completed layer stack 63-62a-61 thereby smearing metal vertically to form a vertical contact.

FIG. 6b presents a schematic view of a further embodiment of a method for providing the top-bottom interconnection in the structure of FIG. 5. In the illustrative embodiment a cross-section 70 of a further embodiment of the flexible display is shown. The flexible display comprises a first electrically conducting layer 74 separated from a second electrically conducting layer 72 by a layer of electrically insulating material 71. In order to enable an electrical contact between the first electrically conducting layer 74 and the second electrically conducting layer 72, a conducting material 73, such as for example conducting glue, is provided in an edge region 76 of the flexible display 70. The electrical contact between the first electrically conducting layer 74 and the second electrically conducting layer 72 is enabled via the material 73. In the case where conducting glue is used for the material 73, the rolled-up structure is reliably affixed. Spacer 75 may be provided for enabling mechanical robustness and for simplifying the structure 70. Layers 72 and 74 may be patterned into stripes substantially transverse, for example orthogonal, to the edge of the substrate 71. Anisotropically conducting glue may be used to prevent establishment of electrical connections in a lateral direction.

FIG. 6c presents a schematic view of a still further embodiment of a method for providing top-bottom interconnections in the structure of FIG. 5. In this embodiment the flexible display 77 comprises a first electrically conducting layer 77a and a second electrically conducting layer 77b isolated from the first electrically conducting layer 77a by means of a layer 78. At an edge portion 77' of the flexible display 77, two layers of conducting material 78a, 78b are provided which, for example, comprise a suitable conducting glue. The first electrically conducting layer 77a and the second electrically conducting layer 77b are put into electrical contact by means of an anisotropically conducting foil 79 having a suitable plurality of electrically conducting tracks 79a, 79b, 79c separated by areas of electrically insulating material. Due to the fact that the tracks 79a, 79b, 79c provide respective paths for the electrical current between the first electrically conducting layer 77a and the second electrically conducting layer 77b, a degree of alignment between the foil 79 and the layers 77a, 77b is not critical, provided that at least one track 79a, 79b, 79c enables a sought electrical contact between said layers. It is noted that this feature can also be used for the embodiment discussed with reference to FIG. 6b. Also in the embodiment of FIG. 6c, the anisotropically conducting glue prevents electrical conduction in a lateral direction L between tracks 79a, 79b, 79c. It will be appreciated that the connectivity means comprises, for example, either a via provided by a chemical or a mechanical removal of a portion of the electrically insulating material, or an edge connectivity region provided by rolling of an edge portion of the flexible layer for affixing a first electrically conducting layer on the second electrically conducting layer, or a conducting bridging means which may be advantageously used on any flexible display with or without combination with the feature of provision of non-deformable areas.

Figure 7:
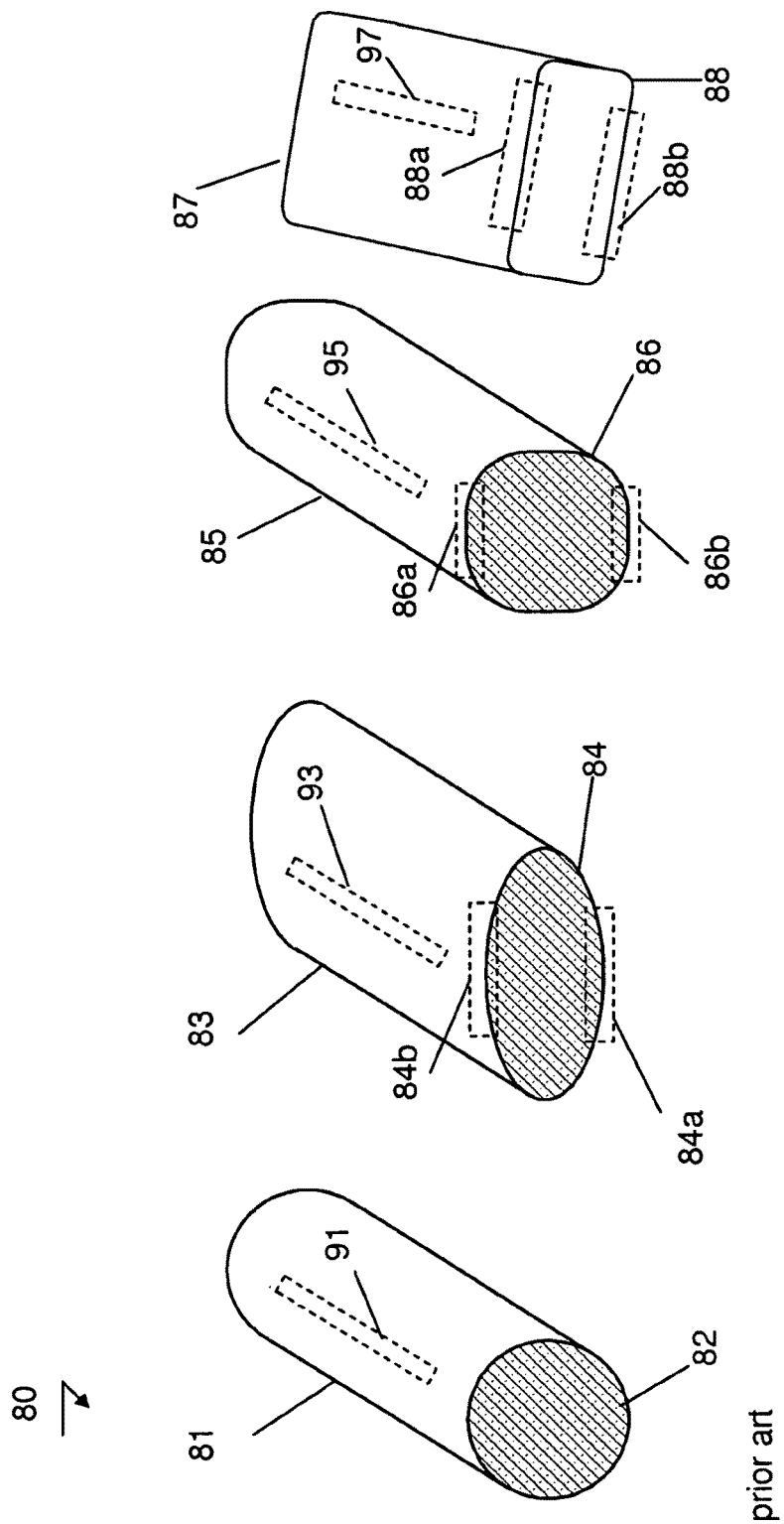
FIG. 7 presents several schematic views of an embodiment of a display supporting member according to the invention.

FIG. 7 presents a schematic view of an embodiment of a display supporting member according to the invention in comparison with a supporting member of the prior art. In the prior art the flexible display (not shown) is rolled-up about a cylindrical body 81 which has a substantially round cross-section. Therefore, substantially all regions of the flexible display undergo deformation during collapsing and extending of the flexible display, which may decrease a life-time of the known flexible display.

In accordance with an embodiment of the invention members 83, 85, 87 may be provided, said members having regions 84a, 84b; 86a, 86b, 88a, 88b of substantially flat surfaces. Therefore, areas of the flexible display conceived to be supported by the regions 84b, 84a, 86a, 86b, 88a, 88b substantially do not undergo any deformation during collapsing or extending. This may substantially increase the durability of the flexible display described herein.

It will be appreciated that although members 83, 85, 87 are depicted with an elliptic cross-section 84 and a truncated square or truncated rectangle cross-section, other embodiments of the members 83, 85, 87 are possible. In addition, the members 81, 83, 85, 87 may be provided with suitably shaped cavities 91, 93, 95, 97 arranged for receiving electronic components (not shown) of the flexible display in its collapsed state. For example, drivers may be received by these cavities. This has an advantage that the flexible display is not mechanically damaged by the electronic components in the collapsed state. In addition, due to this feature the non-deformable areas do not undergo mechanical stress in the collapsed state. Such stress may be caused by generation of different local tensions in a material of the flexible display due to different respective local linear deformations when areas supporting electronic components and areas not supporting electronic components are wound on a member with the same dimension. It will be appreciated that the cavities 91, 93, 95, 97 may be located at any suitable position along a surface of the member 81, 83, 85, 87 conceived to contact the flexible display.

It will be appreciated that while specific embodiments of the invention have been described above, it will be appreciated that the invention may be practiced otherwise than as described. In addition, isolated features discussed with reference to different figures may be combined.

The invention claimed is:

1. An electronic apparatus comprising:
    a flexible electronic display comprising a substantially deformable area and a substantially non-deformable area while in use;
    a plurality of electronic components for enabling electrical connectivity for the flexible electronic display, wherein the electronic components are arranged on the substantially non-deformable area; and
    an interconnecting element for providing an electrical interconnection between the electronic components.

2. The electronic apparatus according to claim 1, wherein the interconnecting element is arranged underneath the flexible electronic display.

3. The electronic apparatus according to claim 2, wherein the interconnecting element comprises a harness structure arranged on a backplane of the flexible electronic display.

4. The electronic apparatus according to claim 3, wherein the harness structure is detachably arranged on the flexible electronic display.

5. The electronic apparatus according to claim 2, wherein the interconnecting element comprises an interconnecting layer patterned on a substrate of the flexible electronic display.

6. The electronic apparatus according to claim 1, wherein the flexible electronic display is arranged on a member having substantially flat surfaces for supporting the substantially non-deformable area of the flexible electronic display.

7. The electronic apparatus according to claim 6, wherein the member is provided with a cavity for receiving the electronic components for a collapsed state of the flexible electronic display.

8. The electronic apparatus according to claim 1, wherein the electronic components are flexible.

9. The electronic apparatus according to claim 1, wherein the electronic components comprise driver components for the flexible electronic display.

10. An electronic apparatus comprising:
    a collapsible, flexible electronic display comprising a substantially deformable area and a substantially non-deformable area while in use; and
    a plurality of electronic components for enabling electrical connectivity for the flexible electronic display, wherein the electronic components are arranged on the substantially non-deformable area;
    wherein the flexible electronic display comprises an interconnecting element for providing an electrical interconnection between the electronic components, wherein the interconnecting element comprises a first layer of electrically conductive material separated from a second layer of electrically conducting material by a layer of electrically insulating material, said first layer and said second layer being locally electrically interconnected using connecting means selectable from a group of: an edge connectivity region provided by rolling of an edge portion of the flexible layer for affixing a first electrically conducting layer on the second electrically conducting layer, or a conducting bridging means.

11. The electronic apparatus according to claim 10, wherein the interconnecting element is arranged underneath the flexible electronic display.

12. The electronic apparatus according to claim 10, wherein the flexible electronic display is arranged on a member having substantially flat surfaces for supporting the substantially non-deformable area of the flexible electronic display.

13. The electronic apparatus according to claim 12, wherein the member is provided with a cavity for receiving the electronic components for a collapsed state of the flexible electronic display.

14. The electronic apparatus according to claim 10, wherein the electronic components are flexible.

15. The electronic apparatus according to claim 10, wherein the electronic components comprise driver components for the flexible electronic display.

* * * * *